United States Patent [19]

Spilo

[11] Patent Number: 5,371,871
[45] Date of Patent: Dec. 6, 1994

[54] SYSTEM FOR SWAPPING IN AND OUT OF SYSTEM MEMORY TSR PROGRAMS BY TRAPPING INTERRUPT CALLS FOR TSR AND SIMULATING SYSTEM INTERRUPT

[75] Inventor: Michael L. Spilo, Briarwood, N.Y.

[73] Assignee: Helix Software Company, Inc., Long Island City, N.Y.

[21] Appl. No.: 951,846

[22] Filed: Sep. 28, 1992

Related U.S. Application Data

[63] Continuation of Ser. No. 397,752, Aug. 23, 1989, Pat. No. 5,167,030.

[51] Int. Cl.$^5$ .............................................. G06F 12/02
[52] U.S. Cl. .............................. 395/425; 364/246.11; 364/263.2; 364/261.6; 364/964.6; 364/DIG. 1; 395/650; 395/700
[58] Field of Search ......................... 395/425, 650, 700

[56] References Cited

U.S. PATENT DOCUMENTS

| | | | |
|---|---|---|---|
| 3,594,732 | 7/1971 | Mendelson | 364/200 |
| 3,618,045 | 11/1971 | Campbell | 364/200 |
| 4,524,415 | 6/1985 | Mills, Jr. et al. | 364/200 |
| 4,825,358 | 4/1989 | Letwin | 364/200 |
| 5,032,981 | 7/1991 | Bril et al. | 364/200 |
| 5,056,057 | 10/1991 | Johnson et al. | 364/900 |
| 5,146,580 | 9/1992 | Naidu et al. | 395/425 |
| 5,189,733 | 2/1993 | Bennett et al. | 395/650 |

*Primary Examiner*—Parshotam S. Lall
*Assistant Examiner*—Ken S. Kim
*Attorney, Agent, or Firm*—Schweitzer Cornman & Gross

[57] ABSTRACT

A method for the allocation of RAM memory space in a microcomputer environment allows for one or more terminate and stay resident (TSR) or other programs to be stored on a remote memory device in a way that preserves their accessability. The method includes the installation of a supervisory program which traps calls for a displaced program and transfers a portion of another program, such as an application-type program, in RAM to remote memory while retrieving the called displaced program from remote memory into the RAM space previously occupied by the transferred portion. The swap function is performed in a manner which preserves the integrity of the swapped program, and which allows operation of the application program to be halted such that it may be restarted without loss upon return from remote memory. In another aspect of the invention a communication TSR is simulated to allow data transfers to the TSR to be processed even if the TSR is in remote memory.

4 Claims, 6 Drawing Sheets

SYSTEM FOR SWAPPING IN AND OUT OF SYSTEM MEMORY TSR PROGRAMS BY TRAPPING INTERRUPT CALLS FOR TSR AND SIMULATING SYSTEM INTERRUPT

This application is a continuation division of application Ser. No. 397,752, filed Aug. 23, 1989 now U.S. Pat. No. 5,167,030.

BACKGROUND OF THE INVENTION

The present invention is directed to a computer memory allocation system allowing efficient use of random access memory (RAM), particularly in microcomputers such as the IBM-PC, XT, AT and PS/2 systems, as well as other personal computers compatible to such PC computers. Specifically, the present invention permits the utilization of a plurality of "terminate and stay resident" (TSR) programs, or other programs, in conjunction with a primary or "application" program, while staying within the computer's normal RAM storage limits, typically 640 kilobytes (640K).

Since their initial appearance, TSRs have become a popular form of software for disc-operating system (DOS) microcomputers. TSRs provide instant access to a great number of functions and deliver a taste of multi-tasking on systems and environments that do not need the full power of a sophisticated operating system. The main drawback of the TSR approach is that the TSRs stay resident or stored in RAM at all times, thus occupying space that may be needed by another program. As application programs such as spreadsheet generators, word processing programs and the like grow more complex, they generally require more RAM space for themselves, thus limiting the space available for TSRs. Conversely, having the TSRs in RAM limits the size of the application program which can be loaded.

The general feature of a TSR program is that, once loaded into the computer's RAM memory, it can be activated at any time. This feature normally permits the operation of an application program to be temporarily suspended to gain access to a TSR. TSR programs are available to check spelling to take notes, to provide instant calculations, to send telecopies, to store databases, and to automate everything from printing labels to dialing a telephone. Thus, as may be appreciated, they provide enormous flexibility to a computer system when they can be utilized with other programs. The shortcoming of such a system, however, is that, as TSR programs are designed to remain in RAM, the space allocated to the TSR is no longer available to other programs. Some TSRs use 200K or more of memory, causing a substantial depletion in available memory. This sometimes prohibits the running of a large-scale application program.

Accordingly, personal computer users have had to choose which TSRs they can live without and, in some cases, have had to remove all TSRs entirely or to juggle them, loading only the TSRs that were deemed to be absolutely essential, depending on the appliction program with which they were to be installed. Such juggling substantially limits the value of a TSR.

In addition, in a network environment delays often experienced between a data transfer request and data receipt, which is often handled by a TSR communications program, can require the maintenance of the TSR in an "active" mode during the duration of the call. If the TSR is disabled, such as in the case where it is desired to reinstitute operation of an application program, the computer system will be unable to handle the received data, causing loss of the data or a system malfunction. It is thus necessary to keep the TSR active during the entirety of the call to prevent such loss, resulting in unnecessary, unproductive use of the system.

The present invention allows TSRs to be removed from RAM, placing them on disk or in expanded or extended memory space not normally able to be used by an active program. This frees all the internal RAM memory previously occupied by the TSRs, making it available for use by other programs. When it is desired a TSR, the invention brings it into RAM, suspending operation of the program currently running in such a manner that full continuity of processing is presented. The invention allocates the necessary RAM space for the TSR, removing and storing the previous contents of the space. After the TSR completes its operation, it is removed from RAM, and the removed contents are returned. The interrupted program is then fully restored.

In another and further aspect of the invention, the invention duplicates the data-handling attributes of a communication TSR in a network environment, thus allowing the TSR to be removed from memory without disrupting a communication link established by it. When data is received the invention emulates the TSR, allowing full receipt of the data and notifiction to the user and/or other software of its arrival.

For a more complete understanding of the present invention and a better appreciation of its attendant advantages, reference should be made to the following detailed description of a preferred embodiment thereof, taken in conjunction with the accompanying drawings.

DESCRIPTION OF A PREFERRED EMBODIMENT

Figure 1A:
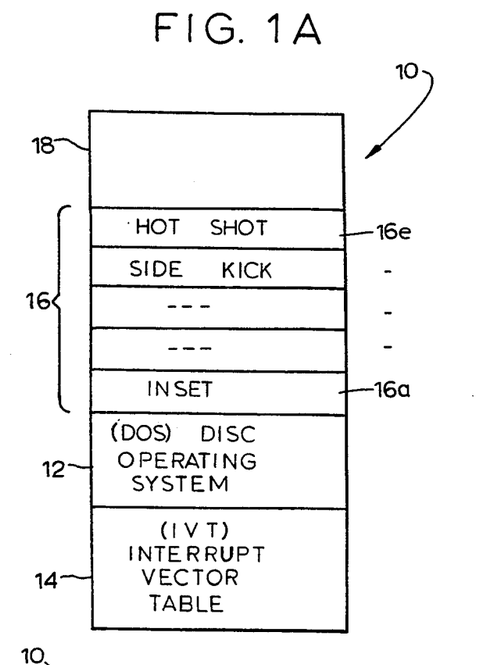
FIGS. 1A and 1B together constitute a diagrammatic illustration of the memory economy achieved by the practice of the invention.
Figure 1B:
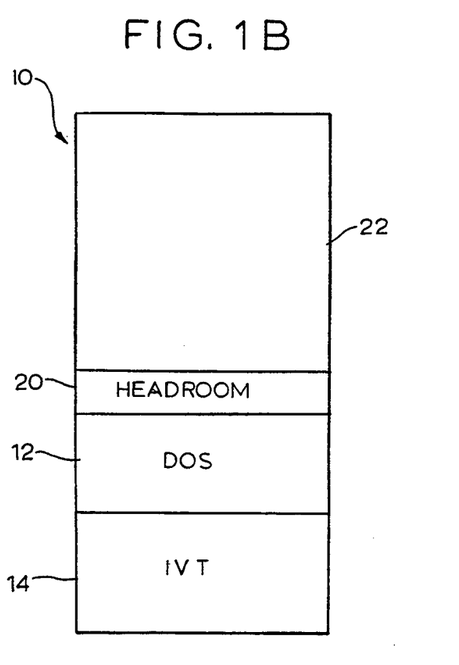
Figure 2:
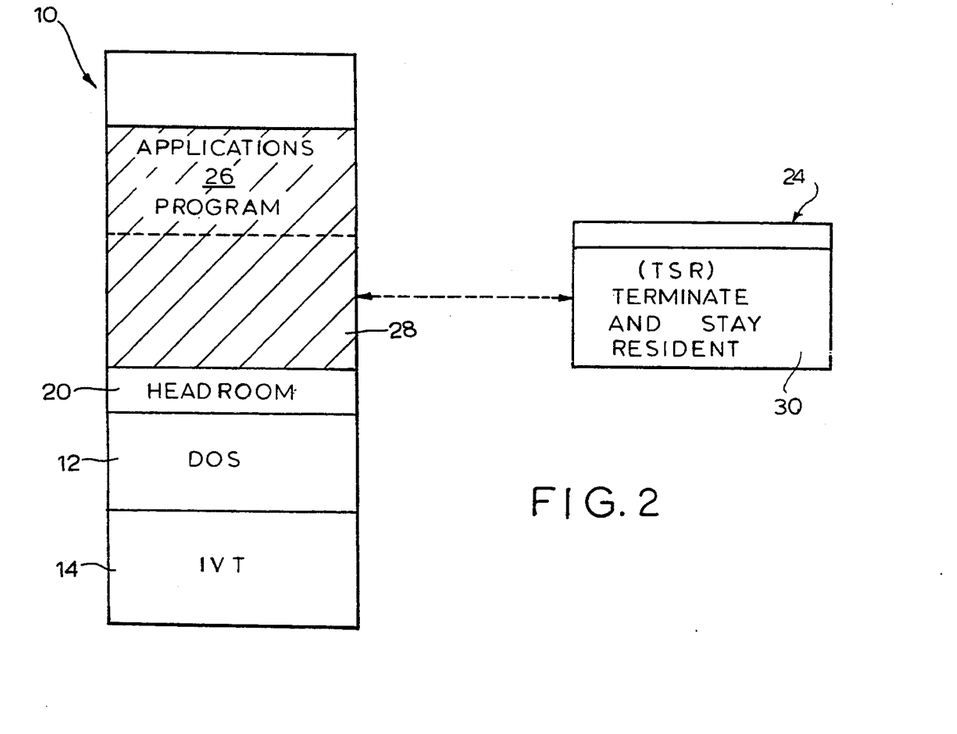
FIG. 2 is a diagrammatic illustration of the memory allocation procedure employed.

With initial reference to FIGS. 1 and 2, FIG. 1 illustrates a typical RAM memory 10 of a microcomputer. Loaded into such memory at the time the computer is turned on or "booted up" are DOS commands 12, which control the basic operation of the computer, and a set of pointers, the interrupt vector table (IVT) 14, which provides handling instructions to the system when an "interrupt", such as a keyboard keystroke, timer signal, or the like, is produced. The remaining RAM space is utilized for active programs, both of an "application" character, as well as TSRs. Pro, grams are loaded into RAM on a first in/last out basis, the first loaded programs occupying the lowest memory positions. As depicted in FIG. 1(a), TSRs, such as Hot-Shot, Sidekick, and the like, 16a–e are normally loaded into RAM by means of a set of commands which are automatically carried out upon system initiation. Documentation for a typical TSR would normally include instruction to the uninitiated as to how to program the computer to autoload the TSR. The methodology of such instructions is well known to those skilled in the art. As depicted, the TSRs 16 can consume a significant amount of available RAM memory, leaving only a relatively small portion 18 available for an application program, whether it be a spreadsheet generator, a word processing program, or the like.

FIG. 1b, on the other hand, illustrates the RAM memory 10 in which a program embodying the present invention is installed. The TSRs 16 are no longer resident in RAM, having been replaced by the inventive, supervisory program 20, hereinafter referred to as "Headroom" or "the Headroom program". The relatively minimal storage requirements of the invention provide significantly more RAM space 22 to be available for the loading of an application program, while still allowing the TSRs it replaces in RAM to be accessed as desired.

As depicted in FIG. 2, the supervisory Headroom program 20 allows the TSRs to remain in storage, such as on hard disk 24, until needed. Normally, the operation of a TSR is invoked by the user causing an interrupt to be generated. A typical. TSR program designates one or more keyboard keys to serve as "hot keys", the activation of which generates an interrupt which invokes the TSR and suspends operation of the primary, application program otherwise in use. The initial processing of the interrupt is controlled by the IVT 14, which is overlaid with the necessary instructions for the uppermost, or most recently installed, program in RAM. After the interrupt is acted upon by the topmost program, it is passed down through RAM, each program in turn having the opportunity to act upon the interrupt.

Typically, a TSR gets the interrupt only after it is acted upon by an application program. The Headroom program recognizes the hot key assignments for each TSR with which it is used and, upon receipt of the proper interrupt, suspends application program processing, locates the TSR 30 on the hard disk or other storage locations, and "swaps" an image of it with a portion 28 of the application program 26, the portion of the program 26 removed being stored on the disk 24 or similar storage facility. After the swap is completed, Headroom allows activation and operation of the TSR in the normal manner. After use of the TSR is completed Headroom does a "reverse swap", bringing back into RAM the portion 28 of the application program swapped out to disk, while returning the then present image of the TSR 30 to update the stored version on disk. Headroom then reactivates the application program 26. In makingthe swaps, Headroom assures that operation of the application program during the swap is completely suspended to prevent a malfunction. In addition, Headroom retains all necessary interrupts and operation codes which are necessary to reinstitute operation of the application program at the completion of the swap.

There is nothing inherently particular about a TSR that allows a swap to be consummated. Headroom can also swap application programs, for example, allowing suspension of operation of a word processing program to access and invoke a spreadsheet program such that data to be used in the word processing program can be generated. A feature of the present invention is the assignment of appropriate "hot keys" to a program over which it is desired the Headroom have control. In addition, multiple swaps can be made, swapping a third program for a second, a fourth for a third, and the like.

A more detailed description of the operation of the present invention will be appreciated and understood by one skilled in the art upon consideration of the flow-charts of FIGS. 3 through 10 in conjunction with the annexed programming code.

Figure 3:
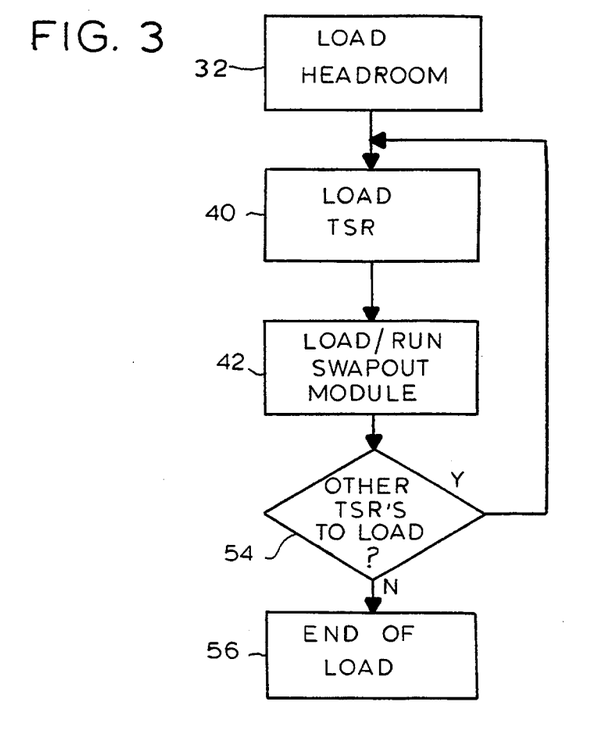
FIG. 3 is a flow diagram depicting the installation of the present invention into a computer system.

FIG. 3 depicts the installation of the invention in a computer. As shown therein, the main supervisory portion of the invention of the Headroom program is first loaded into memory at 32. A TSR is then loaded at 40, which places it directly above Headroom in RAM as shown in FIG. 2. A second portion of the invention, the "Swap-Out" module, is then loaded at 42, which places it directly above the TSR in RAM, and is then executed. The operation of the Swap-Out module is shown in FIG. 4.

Figure 4:
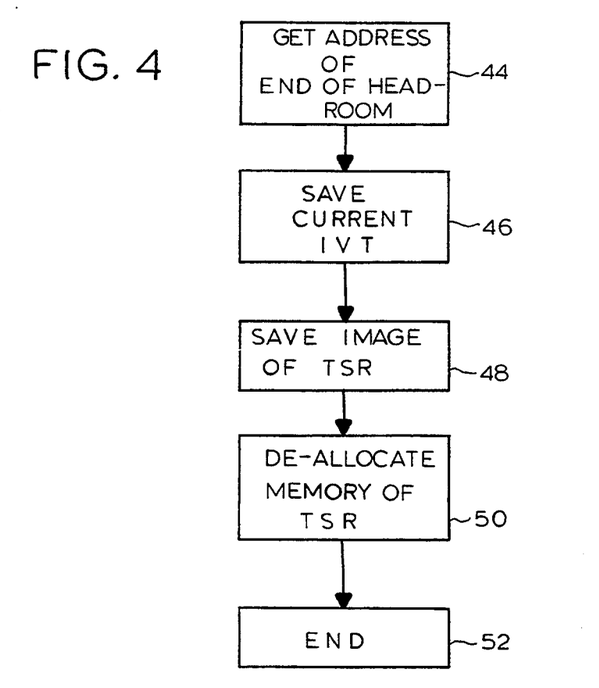
FIG. 4 depicts the initialization of the "swap-out" module of the invention.

As depicted in FIG. 4, Swap-Out first identifies the upper end memory address of Headroom 32 at 44 such that the memory location for the lower end of the contents of RAM to be swapped out or transferred to disk can be located. Swap-Out does not generate IVT pointers, so the condition of the IVT 14 of FIGS. 1 and 2 remains as if the TSR 30 was the topmost program installed in RAM. An image of the IVT as created by the TSR is then saved to disk by Swap-Out at 46. The IVT saved thus contains the pointers utilized by the TSR, which will provide the operating system with the necessary instructions for handling interrupts during the TSR's initiation. An image of the TSR is also saved to disk at 48, as is a portion of the Swap-Out module needed for subsequent activities as will be explained. The assignment of "hot keys" needed by the TSR is also identified and retained by Headroom.

With the TSR and Swap-Out portion being saved, Headroom de-allocates at 50 the space previously utilized by the TSR and Swap-Out such that such memory can be reallocated for use by another program. With the end 52 of the load being reached, the initialization steps may be repeated as many times as is required, as seen at 54 in FIG. 3, each time with the loading of a different TSR with Swap-Out to generate the necessary IVT and transfer the IVT and program images to permanent storage. The loading procedure ends at 56.

After the initialization and loading procedure is run, an application-type program may be loaded into RAM and run in the typical manner. As the application program is installed above Headroom, the IVT is loaded with the application program pointers and allows any interrupt generated to be first acted upon by the application program. After it is made available to the application program, the interrupt is passed down to Headroom, which determines whether it is an interrupt resulting from a TSR "hot key" entry. If so, Headroom invokes the procedure to key in the appropriate TSR. If it is not such an interrupt, the interrupt is passed down to DOS, and the check for a hot key entry is repeated for the following keystroke.

Figure 5A:
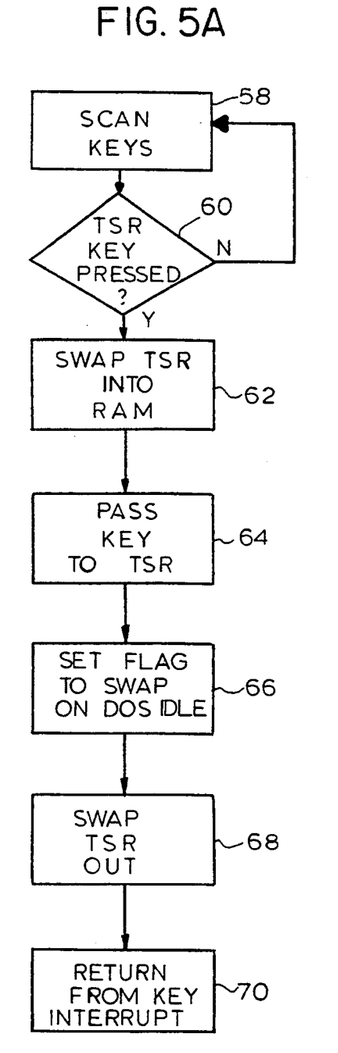
FIG. 5A depicts the steps representing the commencement of the swap-out procedure portion of the present invention.

In order to insure that a TSR is not invoked prematurely, before the application program has ceased processing, Headroom utilizes a two-step procedure, as depicted in FIG. 5, when it determines a TSR-calling key has been pressed at 60 while scanning the keys at 58.

Headroom initially swaps in the called TSR at 62, and passes the initiating interrupt to the TSR at 64 to allow the TSR to begin operation. In passing the interrupt to TSR, however, Headroom simulates an environment in which the TSR cannot begin processing. In such a state, the interrupt is immediately passed back to Headroom, because it is below the TSR in RAM. Upon return of the interrupt, an internal marker is set at 66, indicating to Headroom that the TSR is to be returned to RAM when DOS is idle. As DOS is normally the last element in the RAM chain to receive an interrupt, when it has ceased processing on an interrupt, all other processing has ceased. The TSR is then swapped back out at 68, the piece of the application program removed is reinstalled, and the interrupt is passed down the chain at 70 so that all operations can be performed.

Figure 5B:
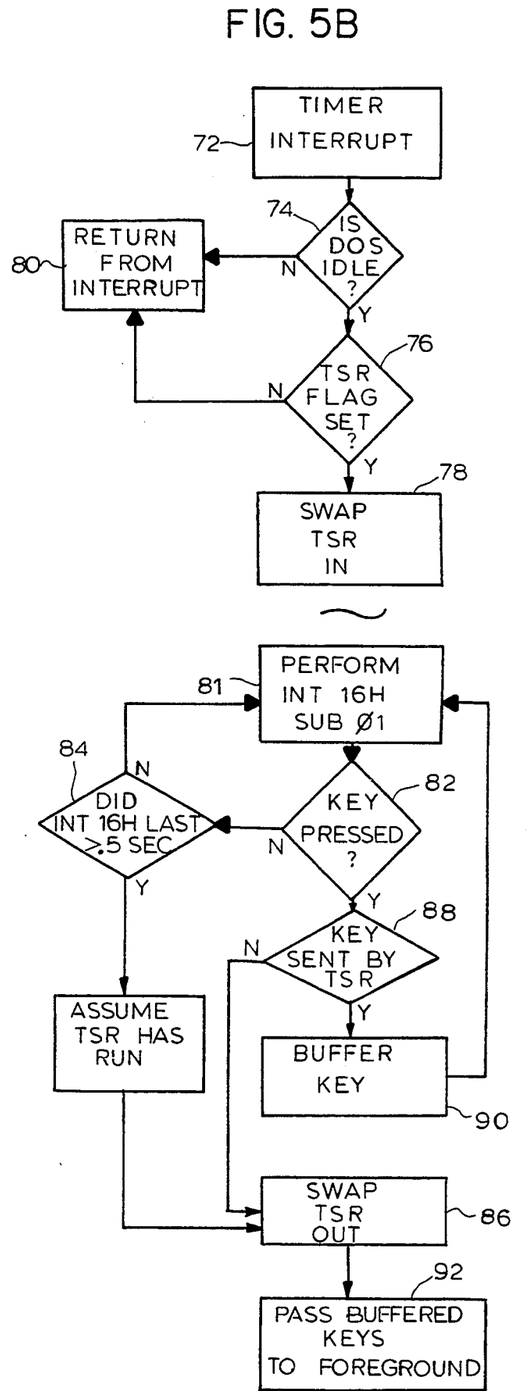
FIG. 5B depicts the portion of the swap-out procedure which determines the timing of a swap-out.

Headroom determines, on a periodic basis, scheduled by timer interrupts 72, whether DOS is in an idle state at 74. If so, Headroom determines at 76 if the flag 68 has been set, and if so, swaps the TSR back in at 78, allowing it to continue from its "frozen" state. If the flag 68 has not been set the timer interrupt is passed at 80.

With the TSR in place and operational, all subsequent interrupts are handled by the TSR, rather than by the now-disabled application program. It is thus necessary to determine when the TSR ends operation.

This is performed by the main Headroom program below the TSR in RAM in conjunction with the Swap-Out portion sitting above the TSR in RAM, which is brought back in with the TSR. Upon Swap-In of the TSR at 78 the Swap-Out module passes control to the TSR to allow it to run. As the module does not generate an IVT, the active IVT is that of the TSR. Normally, interrupts which constitute "internal" communication with the TSR, such as the entry of numerical data for a calculator TSR, are not passed through the TSR and thus are not seen by Headroom or lower programs. An exit command keystroke, however, is passed when control is passed by the TSR. When control is passed to the TSR Swap-Out generates an interrupt at 81. Similar interrupts are generated whenever control is returned to Swap-Out, which could be indicative of the TSR terminating its processing. Thus, the Swap-Out module determines at 82 if a keystroke has been generated. If no keystroke is pending, it checks at 84 whether more than a half second has elapsed for the interrupt. If so, it may be assumed that reason for the interval was the operation of the TSR and its subsequent termination. Thus, a command is issued at 86 to swap the TSR out of RAM.

If it is determined at 82 that a keystroke image has been created, it is determined at 88 whether the image was created by the TSR as output or whether it was from another source. If the keystroke was TSR generated, the stroke is stored at 90 and the interrupt 80 is repeated until either there is a branch to 84 or a non-TSR stroke is sensed. The TSR is then swapped out at 86 and the stored strokes are passed to the application program at 92.

Figures 6, 7:
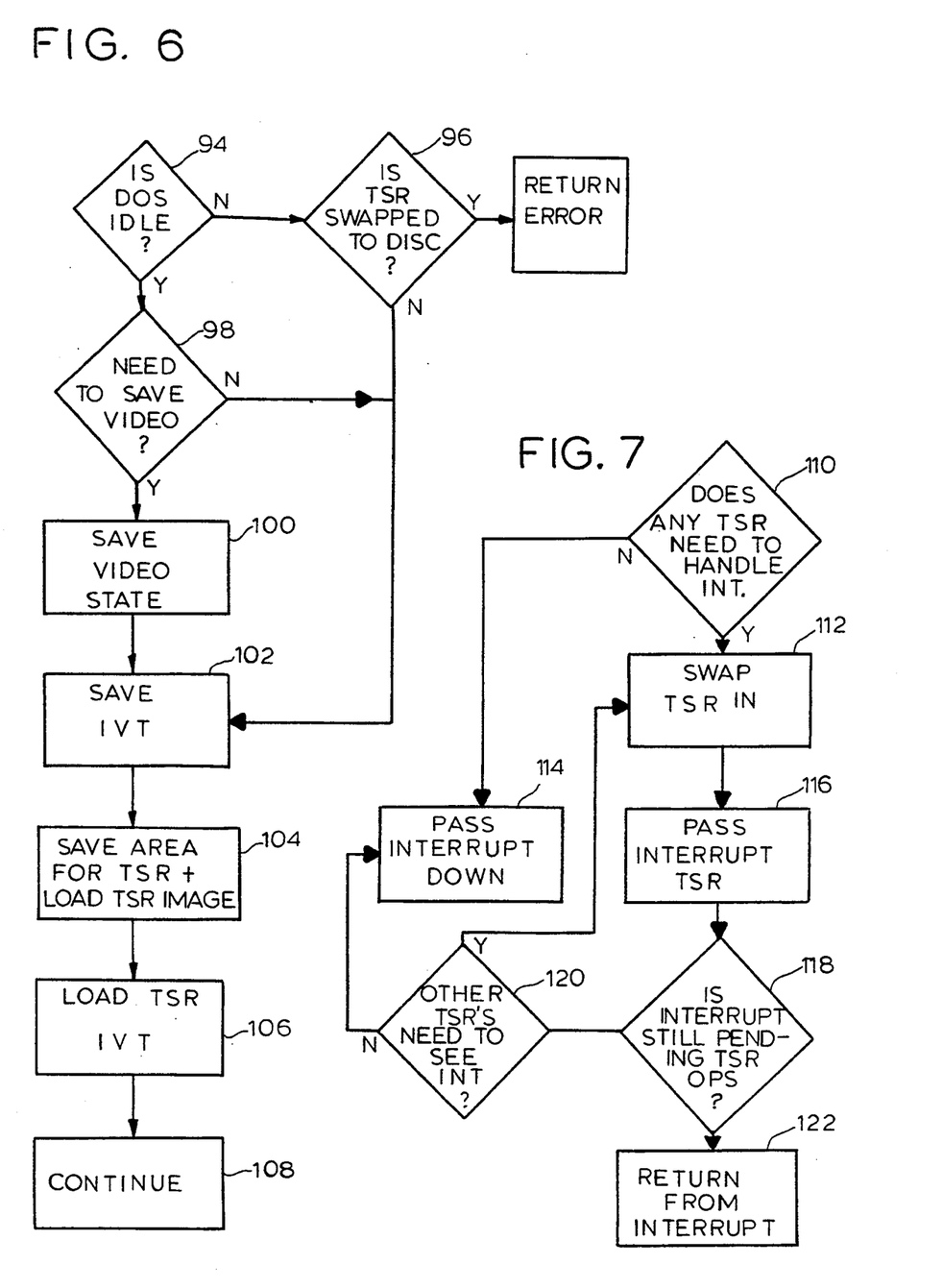
FIG. 6 depicts the steps of the swap-in portion of the invention.
FIG. 7 depicts the steps by which a swap may be invoked by a keystroke interrupt.

Further processing steps associated with each TSR swap-in are shown in FIG. 6. Each swap is proceeded by a check to determine whether DOS is idle at 94, and if not, if the TSR is on disk at 96. This is to insure that the disk can be accessed to retrieve the TSR. If the TSR is not on disk, but rather is on another device, such as expanded memory, the check need not be made. Depending upon the application and the operation of the TSR, Headroom then determines at 98 whether or not any of the current video signal must be saved and, if so, saves it at 100 as required. It then saves the current IVT at 102 as created by the program to be interrupted, along with the contents of the RAM area needed by the TSR at 104 and brings the TSR into RAM. The TSR's IVT is brought in at 106, and the initiating interrupt is passed to the TSR, which takes control. This is accomplished at 108 by step 66 or 80 as shown in FIG. 5 as appropriate for the source of the interrupt.

The invocation of a TSR upon receipt of a keystroke interrupt is a species of the general operation of Headroom upon receipt of an interrupt. This operation is depicted in FIG. 7. When an interrupt is generated, Headroom determines at 110 whether or not it is to be processed by a TSR, and swaps the TSR in at 112 as required as previously discussed. If the interrupt is not TSR-bound, the interrupt is passed down the stack at 114. Otherwise it is identified as a TSR interrupt and the TSR is brought in at 112. The interrupt is passed to the TSR at 116 which then runs in the normal manner. Headroom checks at 118 if the interrupt is still pending when the TSR completes its operation as a result of the interrupt and, if so, determines at 120 whether or not the interrupt is to be passed to any other TSR and if required, steps 112 and following are repeated. If it is not to be passed to a TSR, it passes it at 114 down the chain in the normal manner. If, on the other hand, the interrupt is no longer present at the end of TSR processing, the TSR is swapped out and the application program swapped back in at 122 with its IVT to allow recommencement of application programming from the point where it was disabled.

Figure 8:
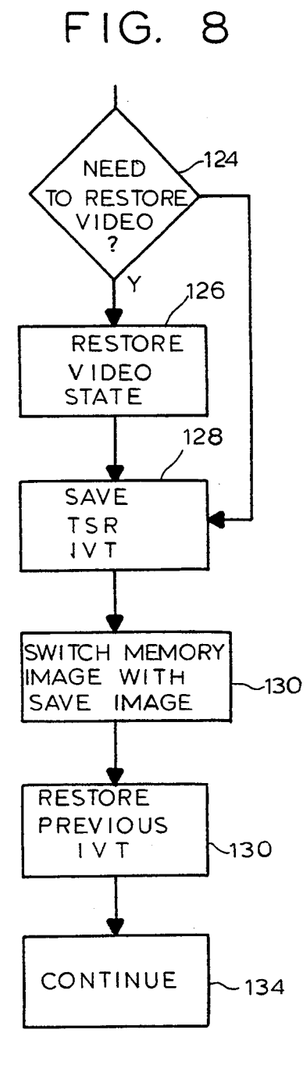
FIG. 8 depicts the TSR exit procedure.

With TSR processing completed, Headroom invokes a TSR exiting procedure, as represented in FIG. 8. Headroom first determines at 124 whether or not video has been moved out and stored, thus requiring it to be brought in and, if so, brings it from memory at 126 to restore the image. It then saves the TSR's IVT at 128 and swaps out the TSR at 130, bringing in the image of the portion of the application program previously swapped out. The application program's IVT is also restored at 132, and application processing recommences at 134 in the normal manner.

In addition to a stand-alone environment, TSRs are often utilized in a network configuration, in which two or more microcomputers are connected together to share resourses and memory. In addition to being coupled to other PCs, the PCs on a network may be coupled through a "gateway" PC to a large mainframe computer. This allows the PCs on the network to transfer information to and from the mainframe. The operating system for a network system is a network basic input/output system (NETBIOS). in such an environment, TSRs are often utilized for data transfer, interfacing with NETBIOS, allowing a data request to be transmitted through a network to obtain from another location data for use, for example, in an application program. In general, NETBIOS can handle two types of data calls or requests, wait and no-wait function calls. In a no-wait call the NETBIOS immediately reports to the initiating program as to the status of a request, and returns control of the system to the initiating program pending receipt of a response from the network. In a wait call, NETBIOS maintain control, essentially maintaining the system in a pause state pending a network response.

With normal operation of a TSR, a no-wait condition is not a problem, since the TSR is always resident in memory, available to receive the data. With the use of Headroom, however, potential problems exist, as the TSR could be swapped out to disk at the time the data is received. Thus, the methodology set forth in FIGS. 9 and 10 are utilized in a network environment to allow Headroom to perform therein.

Figure 9:
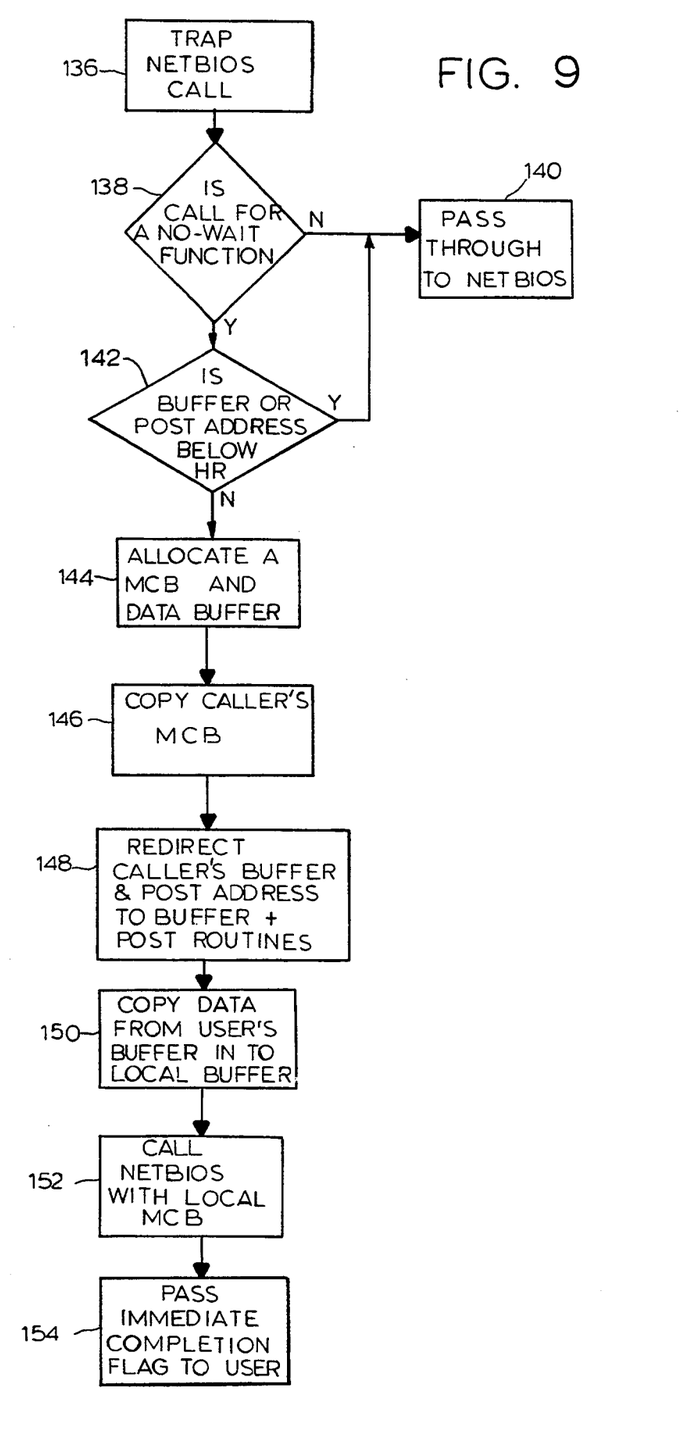
FIG. 9 depicts operation of the invention in a network environment.
Figure 10:
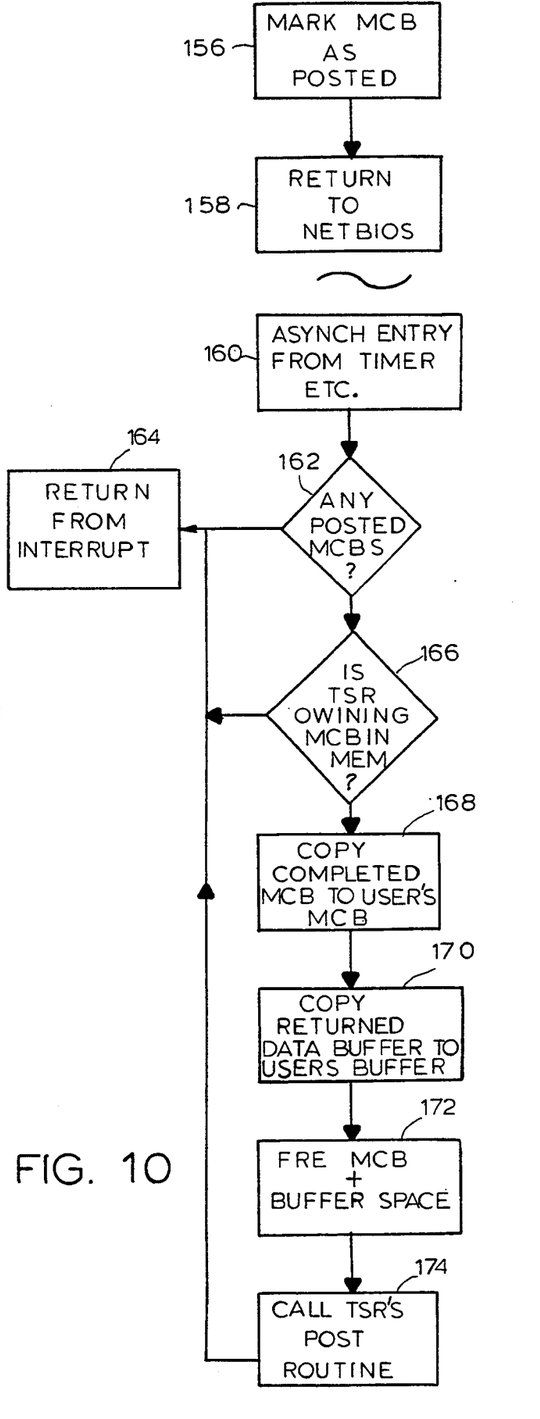
FIG. 10 depicts the steps in a network configuration which allow a communication TSR to be swapped out without interrupting message receipt capability.

As shown in FIG. 9, Headroom accepts at 136 the function call generated by the TSR which would normally go directly to the NETBIOS, and determines at 138 whether it is a wait or no-wait function. If it is a wait function, Headroom immediately passes the request to NETBIOS at 140, and processing ceases until control is returned. There is no benefit gained by swapping out the TSR to allow an application program to run, as control is maintained by NETBIOS until the call is returned. Thus, Headroom need not do anything, but merely permits the TSR to be maintained in memory to await return of the data.

With a no-wait function call, however, Headroom determines at 142 whether or not either the instructions for handling the incoming data, which are located in a message control block (MCB), or the location at which the data is to be stored (post address), are below Headroom in RAM. If so, such locations would normally be in DOS or similar static locations, not being affected by a swap-out of the TSR, which is above Headroom in RAM. If either the buffer or post address is above Headroom, indicating that it is under the control of the TSR, Headroom allocates at 144–150 a message control buffer and/or data buffer within itself, and transfers the necessary control parameters from the TSR to the allocated area to duplicate that of the TSR. This permits NETBIOS to communicate with Headroom directly, rather than the TSR, as all the necessary functions for such communication have been duplicated in Headroom. Once the buffers have been created and loaded as required, Headroom communicates with NETBIOS at 152, which returns a report either that the data request created by the TSR and simulated by Headroom is proper and that the request has been passed through the network or, in the alternative, that the request is improper. In either case, the appropriate flag is passed at 154 by Headroom to the caller.

With the necessary communications parameters duplicated, Headroom allows the communication TSR to be swapped out, while the system retains the ability to obtain an incoming message on its behalf. FIG. 10 represents the steps creating this capability. When NETBIOS is prepared to notify the TSR that a message has been received, it instead activates at 156–158 the message control block established by Headroom that the transaction is complete. Headroom interrogates the MCB at 162 either asynchronously upon a request from the user or as otherwise provided by a system protocol at 160. If the no message has been received, no further action is required and the interrupt is passed in the normal manner at 164. If the inquiry 162 indicates that a message has been received, Headroom determines at 166 whether or not the program which established the message control block, either a TSR or an application program, is in memory. If so, the completed message control block is copied at 168 back to that message control block and the content of the created data buffer is passed at 170 to the original data buffer. The message control block and buffer space created by Headroom are then freed at 172, Headroom informing the TSR or application program at 174 that the message has been received to allow processing by the TSR or the application program. If, on the other hand, the creator of the mesesage control block is not in memory, which would typically be the case with a TSR, Headroom brings in the TSR if authorized to do so or, if not, generates a signal indicating receipt, so the operator can direct Headroom to bring in the TSR.

The listing of program coding, not printed in the patent but made of record, in the file wrapper for the invention as described herein further sets forth in detail the methodology utilized in connection with the invention. One skilled in the art will appreciate that the specific methodology set forth therein may be modified without departing from the true spirit of the invention.

What is claimed is:

1. A method for allocating RAM space in a computer system for active programs, comprising the steps of:
   (a) loading a first program into RAM in a manner which would allow execution thereof from another storage medium;
   (b) identifying the RAM space occupied by said first program and the interrupt vector table associated therewith;
   (c) transferring said first program to system storage prior to execution thereof with said associated interrupt vector table upon occurrence of a system processing event external to execution of said first program;
   (d) loading a second program into at least the RAM space previously utilized by said first program and running said second program;
   (e) monitoring the computer operating system while said second program is running for a call for said first program, and trapping said call;
   (f) suspending processing of said second program in a manner allowing subsequent restart;
   (g) passing the portion of said second program in the identified RAM space of said first program to system storage with its associated interrupt vector table in a manner allowing subsequent restart of said second program upon return of the portion of said second program to RAM;
   (h) returning said first program and interrupt vector table a first time to at least the RAM space made available by said passing of said portion of said second program;
   (i) generating a system interrupt to pass the trapped call to said first program while simulating a nonoperable environment for said first program, whereby said first program and its then current interrupt vector table are immediately returned to storage and said second program portion is returned to the RAM space of first program to institute execution thereof;
   (j) processing said interrupt, whereby at the end of which the computer system has ceased all active processing;
   (k) passing the portion of said second program in the RAM space of said first program back to storage in a manner allowing subsequent restart;
   (l) returning said first program and its interrupt vector table to its RAM space a second time;

(m) allowing said first program to resume execution;
(n) terminating processing of said first program;
(o) returning said first program to storage with its current interrupt vector table;
(p) returning the portion of said second program and its interrupt vector table previously passed to storage to its former RAM space; and
(q) restarting said second program.

2. The method of claim 1, wherein said processing-suspending step for subsequent restart of said second program includes the steps of determining if said second program includes the generation of a video image to be saved and, if so, saving said video image with said second program portion.

3. The method of claim 1 further comprising the steps of:
monitoring the operation of said first program to determine the termination thereof;
transferring said first program back to storage with its then-associated interrupt vector table;
returning the portion of said second program in storage to the RAM space; and
reinstituting operation of said second program.

4. The method of claim 3, wherein said second program return step includes the return of stored video associated therewith.

* * * * *